P. DUNN & T. HARRIS.

WIRE STAPLE.

No. 10,181. Reissued Aug. 15, 1882.

*Witnesses:*
John Grist
Geo. P. Drummond

*Inventors:*
P. Dunn
T. Harris
By Henry Grist
Attorney.

UNITED STATES PATENT OFFICE.

PATRICK DUNN AND THOMAS HARRIS, OF CÔTE SAINT PAUL, QUEBEC, CANADA.

WIRE STAPLE.

SPECIFICATION forming part of Reissued Letters Patent No. 10,181, dated August 15, 1882.

Original No. 257,565, dated May 9, 1882. Application for reissue filed June 16, 1882.

*To all whom it may concern:*

Be it known that we, PATRICK DUNN and THOMAS HARRIS, both of Côte Saint Paul, in the district of Montreal, in the Province of Quebec, Canada, have jointly invented certain new and useful Improvements in Wire Staples; and we do hereby declare that the following is a full, clear, and exact description of the same.

The object of this invention is to make a staple of bent wire which can be driven by an ordinary hammer without spreading the points, thereby avoiding either the splitting of the wood into which the staple is driven or the breaking of the staple at its head.

Our invention consists of a wire staple having the legs pointed one with an inwardly-beveled cut and the other with an outwardly-beveled cut, and the point bent inwardly to align with the inner side of the leg.

Our invention also has reference to staples for fastening the ends of wooden hoops for barrels; and it consists in inwardly depressing the head or crown of the staple, whereby the central portion will not be struck by the workman's hammer. The force of the blow being carried to nearly over the legs of the staple, its head will not be widened.

Figure 1:
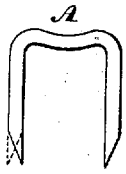
Figure 2:
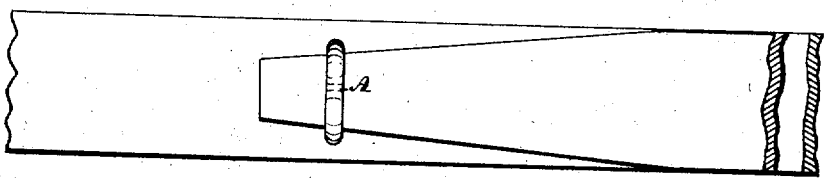

Figure 1 is an elevation of our improved wire staple. Fig. 2 is a top view of the staple as seen when fastening a hoop.

The staple consists of a wire cut and bent in a machine.

In the manufacture of wire staples the head, although intended to be bent square, has a slight crown or upward curve centrally, and which portion, in driving the staple, receives the blow or impact of an ordinary flat-faced hammer, which not being adapted for driving the staple, a specially-constructed hammer is generally used. Such staples, when driven by an ordinary hammer, spread at the points, thereby are hard to drive and liable to break at the head and split the wood into which they are driven. In our improved staple these objections are avoided. We bend the wire constituting the head of the staple for fastening hoops with an inward or downward curve, A, or indentation, whereby the said central portion will be free from contact with the hammer, the result being to remove the force or impact to nearly over the legs of the staple, whereby the tendency of the head to spread is removed. The points are formed by cutting the wire on a bevel in one direction and bending inwardly the point having the outward bevel, whereby an inwardly-turned point is formed to correspond to the opposite leg, the bevel in both legs resisting the tendency to spread in driving.

The pointing of the staple-legs, whereby the bevel will be from the outside inwardly, we consider quite important, as thereby the tendency of the legs to spread when the staple is driven is avoided and a saving of material effected. If the wire were cut so that each leg had a corresponding bevel, a triangular piece of metal would be lost.

We claim as our invention—

1. A wire staple having the extremity of the legs straight on the inside and beveled downwardly from the outer to the inner side to form a point and prevent the legs from spreading, as set forth.

2. A wire staple having one point of the leg cut beveling on the outer side and the other cut parallel thereto and turned inwardly, so as to make both legs straight on the inner side, as set forth, for the purpose described.

3. As an improved article of manufacture, a wire staple having the crown or head depressed or indented, as set forth, for the purpose described.

4. A wire staple having the crown or head depressed or notched, as described, and the points of the legs beveled on the outside, as shown, for the purpose set forth.

5. A wire staple having the crown or head depressed or notched and the extremity of the legs beveled downwardly from the outer to the inner side to form a point and prevent the legs spreading when driving.

6. A wire staple having the head or crown depressed or notched, one point cut beveling on the outside and the other cut parallel thereto and turned inwardly, as set forth, for the purpose described.

PATRICK DUNN.
THOMAS HARRIS.

Witnesses:
M. J. A. DORVAL,
P. H. HERBERT.